US008514743B2

(12) United States Patent
Raman et al.

(10) Patent No.: US 8,514,743 B2
(45) Date of Patent: Aug. 20, 2013

(54) MAINTAINING BALANCE OF ACTIVE LINKS ACROSS NETWORK DEVICES IN A DOUBLE-SIDED VIRTUAL PORT-CHANNEL ENVIRONMENT

(75) Inventors: Pirabhu Raman, San Jose, CA (US);
Sanjay Sane, Fremont, CA (US);
Kalyan Ghosh, Santa Clara, CA (US);
Yuan-Chi Ma, San Jose, CA (US);
Man-Yee Hau, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 490 days.

(21) Appl. No.: 12/802,951

(22) Filed: Jun. 17, 2010

(65) Prior Publication Data
US 2011/0310729 A1 Dec. 22, 2011

(51) Int. Cl.
*H04L 12/28* (2006.01)
(52) U.S. Cl.
USPC .......................................................... 370/254
(58) Field of Classification Search
None
See application file for complete search history.

(56) References Cited

U.S. PATENT DOCUMENTS

| | | | | |
|---|---|---|---|---|
| 6,078,575 A | * | 6/2000 | Dommety et al. | 370/338 |
| 6,556,539 B1 | * | 4/2003 | Henderson | 370/217 |
| 2003/0072326 A1 | * | 4/2003 | Alasti et al. | 370/462 |
| 2008/0089247 A1 | | 4/2008 | Sane et al. | |
| 2009/0073875 A1 | * | 3/2009 | Kashyap | 370/228 |
| 2010/0226260 A1 | * | 9/2010 | Zinjuvadia et al. | 370/248 |
| 2012/0113835 A1 | * | 5/2012 | Alon et al. | 370/252 |

* cited by examiner

*Primary Examiner* — Kevin C Harper
(74) *Attorney, Agent, or Firm* — Cindy Kaplan

(57) ABSTRACT

In one embodiment, a method includes configuring a first network device for operation in a first logical group with a second network device, receiving information from other network devices configured for operation in a second logical group, the information uniquely identifying each of the other network devices within the second logical group, and assigning a priority to each link connecting the first network device to the second logical group network devices. A portion of the links are selected as active links based on the link priorities and the link priorities are assigned such that a balance of active links is maintained across the second logical group network devices. An apparatus for maintaining a balance of active links across the network devices is also disclosed.

20 Claims, 5 Drawing Sheets

MAINTAINING BALANCE OF ACTIVE LINKS ACROSS NETWORK DEVICES IN A DOUBLE-SIDED VIRTUAL PORT-CHANNEL ENVIRONMENT

TECHNICAL FIELD

The present disclosure relates generally to communication networks, and more particularly, to maintaining a balance of active links across network devices.

BACKGROUND

In communication networks various redundancy mechanisms provide resilient interconnection of nodes. For example, multiple links may exist between network devices, with one or more of the links configured as an active link while remaining links are standby links. In some cases, it may be beneficial to aggregate the physical links into logical links, which provide higher aggregate bandwidth, load balancing, and link redundancy.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
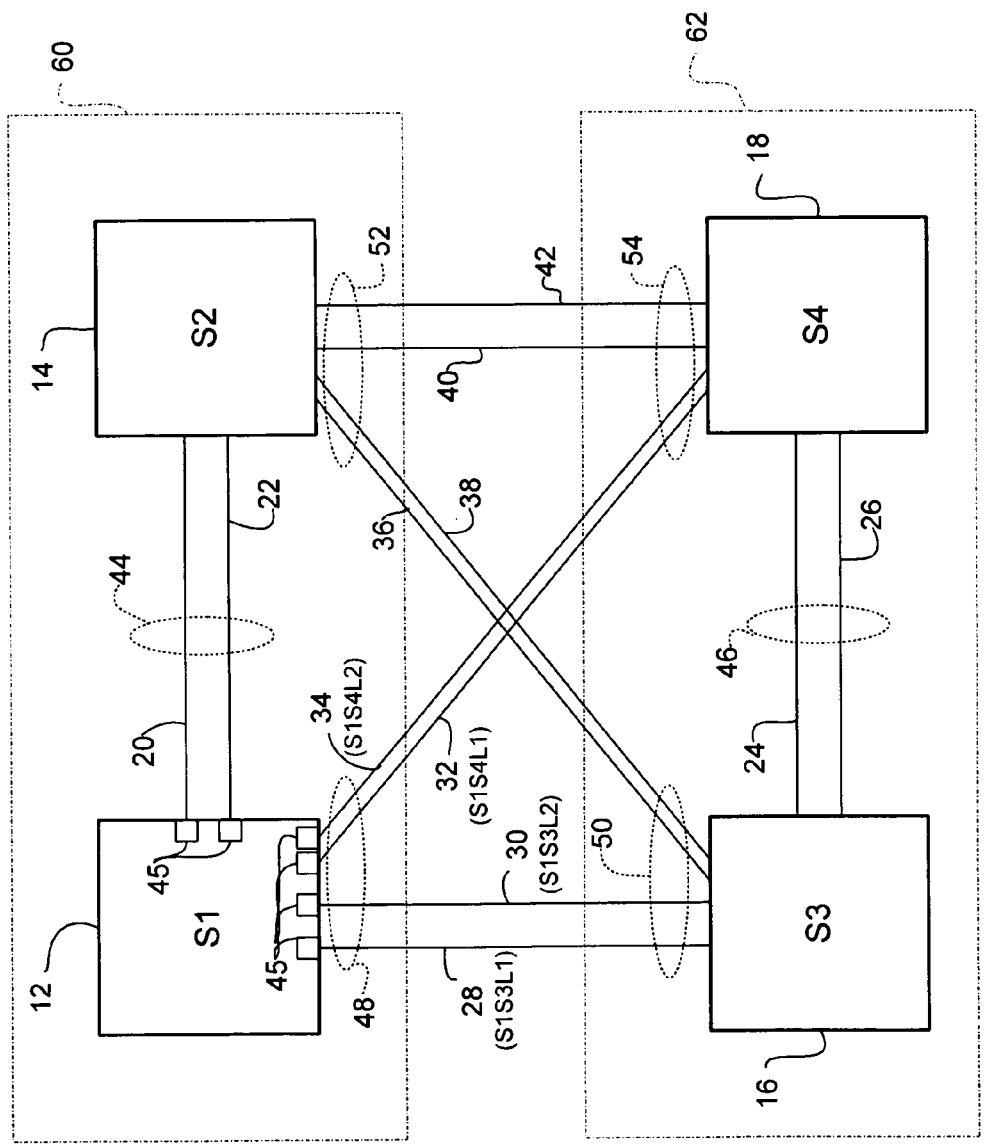
FIG. 1 illustrates an example of a network in which embodiments described herein may be implemented.

In one embodiment, a method generally comprises configuring a first network device for operation in a first logical group with a second network device, receiving information from other network devices configured for operation in a second logical group, the information uniquely identifying each of the other network devices within the second logical group, and assigning a priority to each link connecting the first network device to the second logical group network devices. A portion of the links are selected as active links based on the link priorities and the link priorities are assigned such that a balance of active links is maintained across the second logical group network devices.

In another embodiment, an apparatus generally comprises a plurality of ports for communication with a first network device in a first logical group, and for communication with other network devices in a second logical group, a processor for uniquely identifying each of the other network devices within the second logical group based on information received therefrom, assigning a priority to each link connecting the apparatus to the second logical group network devices, and selecting active links based on the link priorities. The link priorities are assigned such that a balance of active links is maintained across the second logical group network devices.

The apparatus further includes memory for storing the information received from the second logical group network devices.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other embodiments and applications without departing from the scope of the embodiments. Thus, the embodiments are not to be limited to those shown, but are to be accorded the widest scope consistent with the principles and features described herein. For purpose of clarity, features relating to technical material that is known in the technical fields related to the embodiments have not been described in detail.

Neighboring devices in a communications network are often interconnected through multiple physical links. The embodiments described herein allow for the aggregation of physical links from two or more network devices into a logical link or port-channel. The port-channel formed by the aggregation of physical links is referred to herein as a virtual port-channel (vPC). The virtual port-channel allows links that are physically connected to two different network devices to appear as a single port-channel. The two or more network devices that coordinate to form the vPC are referred to herein as a vPC complex. The term 'virtual port-channel' as used herein refers to any logical group of physical links connected to two or more network devices or interfaces coupled to the physical links. The term 'virtual port-channel complex' as used herein refers to any logical group of network devices that coordinate to form the vPC.

The embodiments described herein maintain a balance of active links across network devices within a vPC complex. The vPC complex may be connected to another vPC complex so that the embodiments provide dynamic equal cost multipathing in the deployment of a double-sided vPC. In one embodiment, the network devices set priorities of ports (links) such that the active links of the virtual port-channel are about equally distributed across the network devices of the vPC complex. The generally equal distribution provides improved availability.

The embodiments operate in the context of a data communication network including multiple network elements. Some of the elements in a network that employs the embodiments may be network devices such as switches, routers, servers, or hosts. The network device may be implemented on a general purpose network machine such as described below with respect to FIG. 5.

Referring now to the drawings, and first to FIG. 1, an example of a network that may implement embodiments described herein is shown. The topology shown in FIG. 1 may be used, for example, in an aggregation layer to core layer, layer 2 to layer 3 boundary, or in data center interconnects. The network shown in FIG. 1 includes network devices 12 (S1), 14 (S2), 16 (S3), and 18 (S4) in communication with one another via multiple links 20-42. The network devices 12, 14, 16, 18 may be switches or other network devices configured to perform switching or routing functions. For example, the network device 12, 14, 16, 18 may be a NEXUS 5000 or NEXUS 7000 switch available from Cisco Systems, Inc. of San Jose, Calif. In one example, the network devices 16, 18 are access layer switches (e.g., NEXUS 5000) in communication with aggregation layer switches 12, 14 (e.g., NEXUS 7000).

It should be noted that FIG. 1 does not depict the entire network, but shows only a portion of the network. The switches 12, 14, 16, 18, may be connected to other network devices, such as servers, hosts, or switches, or other networks. It is to be understood that the portion of the network shown in FIG. 1 is only an example and that the embodiments described herein may be implemented in other networks having different topologies or network devices, without departing from the scope of the embodiments.

Each of the switches 12, 14, 16, 18 is connected to neighboring switches through multiple physical links which are configured as logical links or port-channels. Physical links are also referred to herein as physical interfaces or channels, while logical links are also referred to as logical interfaces or port-channels. In the example shown in FIG. 1, switch S1 is connected to S2 via links 20 and 22, switch S3 via links 28 and 30, and switch S4 via links 32 and 34. Switch S2 is connected to switch S3 via links 36 and 38, and switch S4 via links 40 and 42. Switches S3 and S4 are connected via links 24 and 26. Each switch includes a plurality of ports 45 located at each end of the physical links. For simplification, ports 45 are shown only at switch S1. Switch S1 includes six ports corresponding to links 20, 22, 28, 30, 32, and 34.

Each of the switch pairs 12, 14 and 16, 18 form a vPC complex. As illustrated in FIG. 1, switches S1 and S2 form one vPC complex 60, and switches S3 and S4 form another vPC complex 62. Switches S1 and S2 coordinate with each other to form vPC 50 to switch S3 and vPC 54 to switch S4. Switches S3 and S4 coordinate with each other to form vPC 48 to switch S1 and vPC 52 to switch S2. Virtual port-channels are thus formed in both directions. Since the topology shown in FIG. 1 includes two virtual port-channels, it is referred to herein as a double-sided virtual port-channel. Switches in the same vPC complex (e.g., switches S1 and S2) coordinate between one another and use the same vPC system-ID, described below.

In one embodiment, the links 20, 22 between switches S1 and S2 form a virtual port-channel peer link 44. The links 24, 26 between switches S3 and S4 form virtual port-channel peer link 46. As noted above, the embodiments described herein balance the active links across the vPC switches. If the active links were not balanced, traffic may cross the vPC peer link and expected bandwidth would not be achieved. The vPC peer links 44, 46 may be used to communicate information between the control planes of the switches so as to carry out peer functions of the vPC complex 60, 62. For example, the vPC peer link 44, 46 may communicate state information regarding the links of the vPC. The information conveyed by the vPC peer links 44, 46 may also be conveyed through other mechanisms (e.g., wirelessly or indirectly through other devices) in which case the vPC peer links are not necessary.

While switches S1 and S2 (and S3 and S4) cooperate to form virtual port-channels, they can also operate independently. For example, switches S1 and S2 may have a distributed control plane, distributed data plane, and distributed management. The distributed nature provides advantages of scalability and simplicity of implementation. All switches can run independent control planes, and forwarding states of non-vPC ports are controlled independently by each switch.

Figure 2:
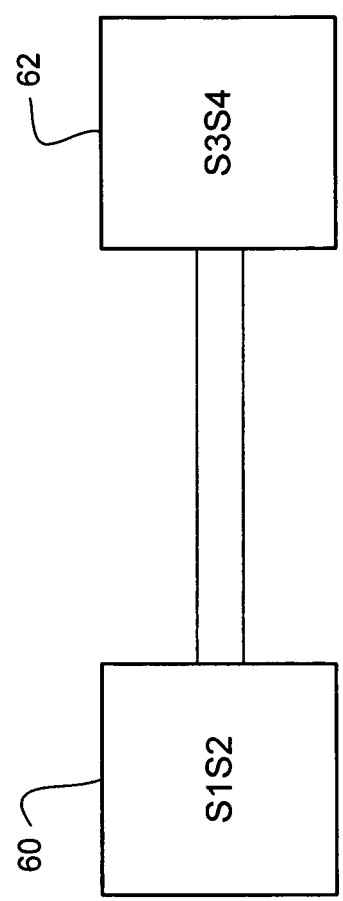
FIG. 2 illustrates a logical topology for the network of FIG. 1.

FIG. 2 illustrates the logical topology of FIG. 1. Switches S1 and S2 form a first logical group (vPC complex S1S2) 60 and switches S3 and S4 form a second logical group (vPC complex S3S4) 62. For optimal load balancing and improved resiliency, each switch preferably selects about an equal number of active links with each vPC peer link partner. For example, in the network of FIG. 1, switch S1 selects about an equal number of active links between switches S3 and S4.

Thus, no single switch will act as a single point of failure and improved utilization is achieved. Without the embodiments described herein, switches S1 and S2 would view switches S3 and S4 as a single switch, and switches S3 and S4 would view switches S1 and S2 as a single switch (FIGS. 1 and 2). Thus, there would be no way to balance the active links across the network devices within the vPC complex. As described in detail below, the embodiments described herein allow each switch within the vPC complex to advertise that it is vPC capable and uniquely identify itself within the vPC complex.

Figure 3:
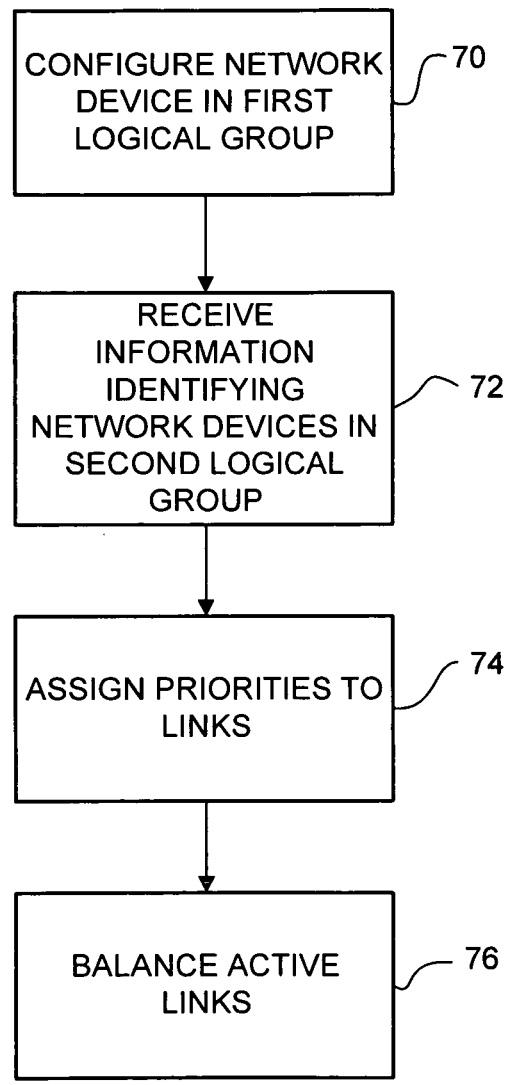
FIG. 3 is a flowchart illustrating a process for maintaining balance of active links across network devices in double-sided virtual port-channels.

FIG. 3 is a flowchart illustrating a process for maintaining a balance of active links among network devices in a double-sided virtual port-channel environment, in accordance with one embodiment. At step 70, a first network device (e.g., switch S1 in FIG. 1) forms a first logical group (vPC complex 60) with a second network device (peer switch S2). The switch S1 is also in communication with other network devices (switches S3 and S4) within a second logical group (vPC complex 62). In one embodiment, configuring the network device for operation in a vPC may include determining a common system identifier for the vPC complex, enabling a vPC feature at the network devices in the vPC, and establishing a vPC peer link, for example. The switch S1 receives messages (advertisements) from the second logical group network devices (S3, S4) (step 72). The messages contain information uniquely identifying each of the network devices within the second logical group 62 so that S1 can identify which link is connected to which switch in the vPC complex. The switch S1 assigns priorities to the links (ports) 28, 30, 32, 34 (step 74) as they come online. Active links are selected based on the link priorities. The switch 51 reassigns the priorities as required such that a balance of active links is maintained across network devices of the second logical group 62 (step 76).

It is to be understood that the process described above and shown in FIG. 3 is only one example and that steps may be removed, added, combined, or reordered, without departing from the scope of the embodiments. Also, the process may be automated thus reducing manual intervention.

It is to be understood that maintaining a balance of active links across network devices may include having an equal number of active links between switches S1 and S3 and switches S1 and S4 (e.g., one active link each, two active links each, etc.) or an approximately equal number of active links between each pair of switches (e.g., one active link between switches S1 and S3, two active links between switches S1 and S4, etc.).

In one embodiment, the switches exchange protocol data units (PDUs) as part of the process for establishing a virtual port-channel. These PDUs and other similar packets for communicating protocol related data are referred to herein as link aggregation protocol packets. The link aggregation protocol packets communicate data used to establish the vPCs.

One protocol that may be used to aggregate multiple physical links into a vPC is the IEEE 802.3ad Ethernet standard, referred to as Link Aggregation Control Protocol (LACP). Such mechanisms allow aggregation of several links or ports into a logical link or port-channel.

In one embodiment, conventional LACP advertisements (messages) are modified to communicate vPC data including identification of switches within the vPC complex. An example of an LACP PDU sent by a switch in the vPC complex contains the following information:

vPC System ID;
vPC System Priority;
Port Information;

TLV (Type-Length-Value) to uniquely identify the switch as vPC capable; and

TLV to uniquely identify the switch within the vPC complex.

The vPC system ID uniquely identifies a vPC complex. The same value is used by switches within the same vPC complex (e.g., switches S1 and S2). The same vPC system priority is assigned to each network device in the vPC complex. In one embodiment, the system identifier comprises a globally unique identifier, such as a switch priority number concatenated with a global media access control (MAC) address.

Port information includes a port identifier and port (link) priority. In one embodiment, the port identifier comprises the port priority concatenated with a port number. Links may be selected for active status based on which links have the highest (or lowest) port priority or port identifier associated therewith. The assignment of values to port priorities can therefore determine the order in which ports are selected for active status.

Information identifying the network device as vPC capable and uniquely identifying the network device within the vPC complex may be encoded as a TLV in the LACP message, for example. It is to be understood that other types of identifiers may also be used to uniquely identify the switch. Each switch uses this information to identify if it is connected to two different members of the same vPC complex.

The following provides an example illustrating the selection of link (port) priorities at switch S1 in the topology illustrated in FIG. 1. In this example the vPC system ID of S1S2 has a higher priority than the vPC system ID of S3S4. The S1S2 complex therefore controls which ports can be part of the port-channel. In the case where a vPC complex comprises two network devices, ports of a first network device may be assigned odd numbers and the ports of a second network device may be assigned even numbers. S1 and S2 thus coordinate between themselves and one switch picks even port priorities while the other switch picks odd port priorities. The port (link) priorities are dynamically assigned as the ports come up. In this example, switch S1 assigns even port priorities and S2 assigns odd port priorities.

Based on the order in which links 28, 30, 32, 34 come up, switch S1 assigns increasing port priorities such as 2, 4, 6, etc. While assigning port priorities, switch S1 tries to balance the number of active links between switches S1 and S3, and switches S1 and S4. For example, links 28 and 30 come up first and are assigned priorities 2 and 4. Based on information received from switches S3 and S4, switch S1 knows that links 28 and 30 are connected to a different switch than links 32 and 34. When link 32 is brought up, switch S1 recognizes that it is connected to a different switch of the vPC complex 62 and modifies the priorities to balance the active links across the switches S3, S4 of the vPC complex. Switch S1 therefore changes the priority of link 30 to 6 and assigns link 32 a priority of 4. After rebalancing is performed, the port priorities are as follows:

Link 28 (S1S3L1)—2
Link 32 (S1S4L1)—4
Link 30 (S1S3L2)—6
Link 34 (S1S4L2)—8

Links 28 and 32 can then be selected as active links based on their priorities, while links 30 and 34 are configured as standby links. This provides one active link and one standby link between switches S1 and S3 and between switches S1 and S4.

The vPC complex devices then advertise through the link aggregation protocol packets the priority of each of its individual vPC ports to its partner network device at the other end of the vPC. Once it receives the link aggregation protocol packets, the partner network device can assign to its physical port that received the link aggregation protocol packet the same port priority as that of its counterpart vPC complex port.

The port (link) priority information is used by the network device to select links for active status. For example, links may be selected as active links if they have a numerically lower port identifier. That is, a port with the lowest port identifier is selected first, then the port with the next lowest port identifier is selected, etc. The link priority may also refer to an assignment of an active or standby priority, rather than a relative priority assigned to each of the links.

The embodiments described herein are not limited to initial link selection, but may also be used to reassign port priorities of the vPC network device in the case of a link failure so as to preserve the balanced distribution of active links across the network devices of the vPC complex. For example, if a link goes down, a network device can take the port priority from the failed link and assign the priority to another of its links.

Figure 4:
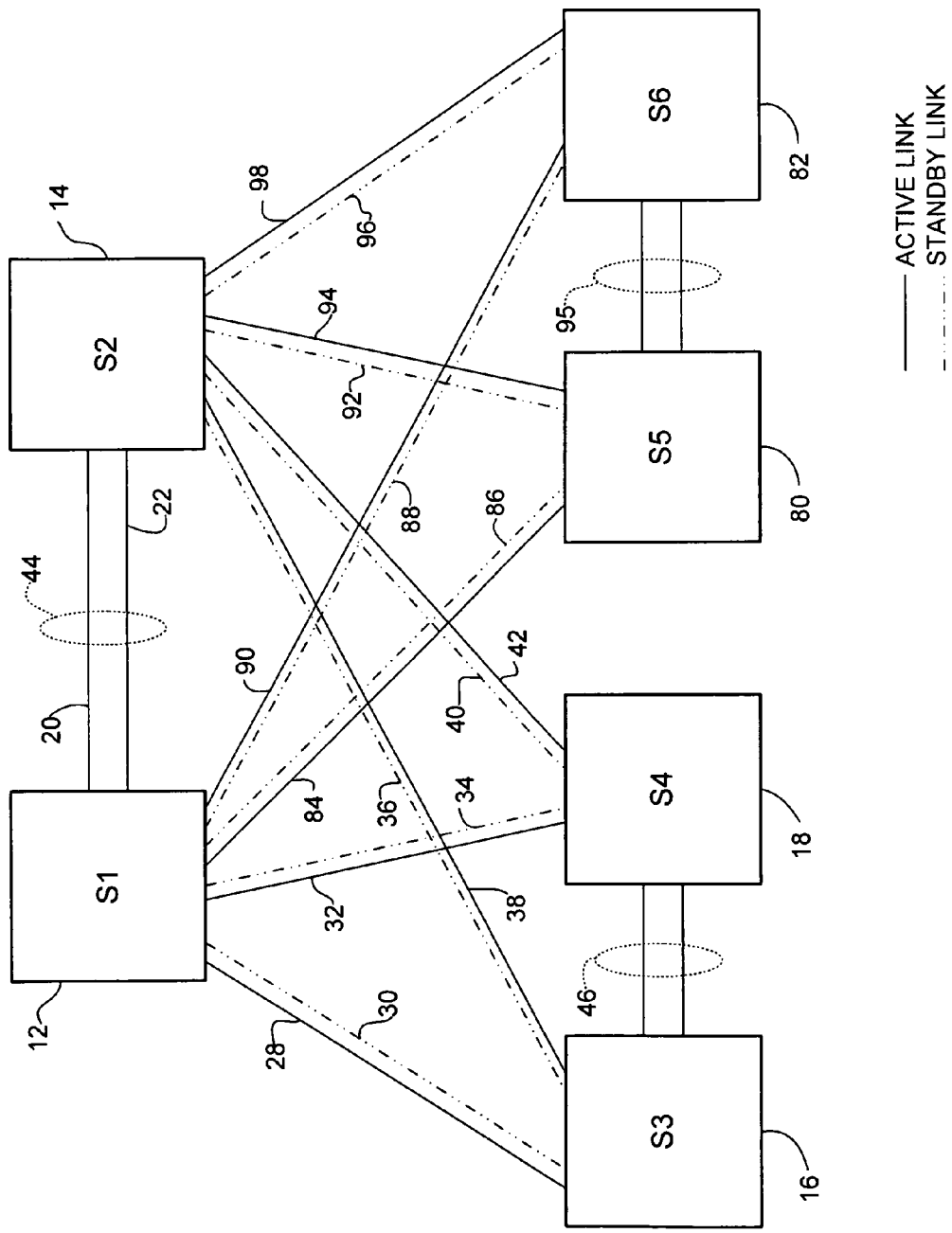
FIG. 4 illustrates another example of a network in which embodiments described herein may be implemented.

FIG. 4 illustrates the example of FIG. 1 with an additional vPC complex including switches S5 and S6 connected via vPC peer link 95. In this example, an equal number of active links are chosen across the vPC peer switches. Links 28, 32, 38, 42, 84, 90, 94, and 98 are active links. Links 30, 34, 36, 40, 86, 88, 92, and 96 are standby links. Traffic among access switches S3, S4, S5, and S6 is locally switched at switches S1 and S2. Traffic from access switches S3, S4, 55, and S6 does not cross the vPC peer-link 44 between switches S1 and S2. If an equal number of active links were not chosen across the vPC peer switches S1 and S2 (e.g., links 36, 38, 40, 42, 84, 86, and 88, 90 active, while the rest of the links are standby), traffic between switches S3 and S4 would be locally switched at S2 and traffic between S5 and S6 would be locally switched at S1. In this case traffic between any other combinations (e.g., S3 to S5) would cross the peer-link, resulting in reduced bandwidth.

Figure 5:
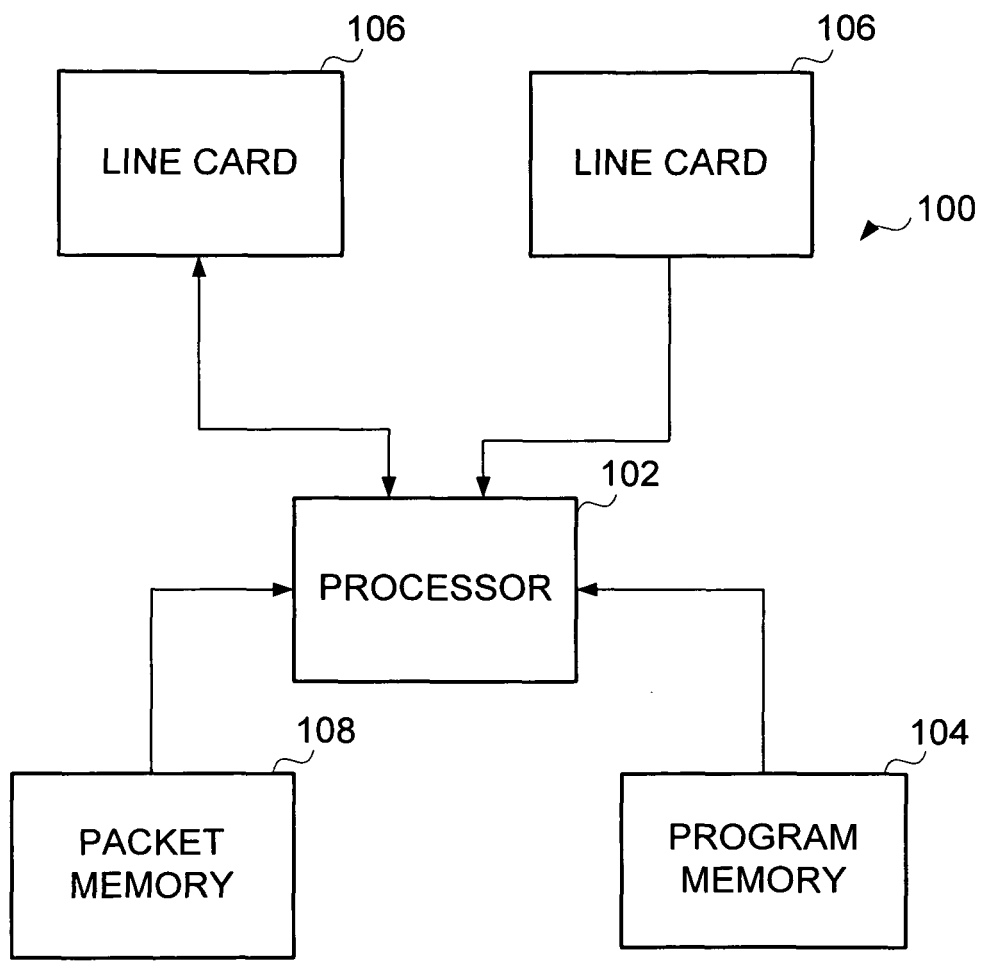
FIG. 5 is a block diagram illustrating an example of a network device useful in implementing embodiments described herein.

FIG. 5 depicts a network device 100 that may be used to implement embodiments described herein. Network device 100 is configured to implement all of the network protocols and extensions thereof described herein. In one embodiment, network device 100 is a programmable machine that may be implemented in hardware, software, or any combination thereof. Logic may be encoded in one or more tangible media for execution by a processor. For example, processor 102 may execute codes stored in a program memory 104. Program memory 104 is one example of a computer-readable medium. Program memory 104 can be a volatile memory. Another form of computer-readable medium storing the same codes is a type of non-volatile storage such as floppy disks, CD-ROMs, DVD-ROMs, hard disks, flash memory, etc.

Network device 100 interfaces with physical media via a plurality of line cards (network interfaces) 106. Line cards 106 may incorporate Ethernet interfaces, DSL interfaces, Gigabit Ethernet interfaces, 10-Gigabit Ethernet interfaces, SONET interfaces, etc. As packets are received, processed, and forwarded by network device 100, they may be stored in a packet memory 108. To implement functionality according to the system, line cards 106 may incorporate processing and memory resources similar to those discussed above in connection with the network device as a whole. It is to be understood that the network device 100 shown in FIG. 5 and described above is only one example and that different configurations of network devices may be used.

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:
    configuring a first network device for operation in a first logical group with a second network device;
    receiving, at the first network device, information from other network devices configured for operation in a second logical group, said information uniquely identifying each of said other network devices within said second logical group; and
    assigning, at the first network device, a priority to each link connecting said first network device to said second logical group network devices;
    wherein a portion of said links are selected as active links based on said link priorities and said link priorities are assigned such that a balance of active links is maintained across said second logical group network devices.

2. The method of claim 1 further comprising transmitting said link priorities to said second logical group network devices.

3. The method of claim 1 wherein assigning said link priorities comprises assigning said link priorities as said links come online and reassigning said link priorities as required to balance the active links across said second logical group network devices.

4. The method of claim 1 further comprising receiving an indication of a failure at one of said active links and reassigning said priorities to balance said active links across said second logical group network devices.

5. The method of claim 1 wherein assigning a priority comprises assigning a set of unique even numbers or a set of unique odd numbers.

6. The method of claim 1 wherein receiving said information comprises receiving a Link Aggregation Control Protocol (LACP) message.

7. The method of claim 6 wherein said LACP message comprises a TLV (Type-Length-Value) field containing an identifier uniquely identifying said second logical group network device.

8. The method of claim 6 wherein said LACP message comprises a logical group ID and a logical group priority.

9. The method of claim 1 further comprising communicating with said second network device via a virtual port-channel peer link.

10. An apparatus comprising:
    a plurality of ports for communication with a first network device in a first logical group, and other network devices in a second logical group;
    a processor for uniquely identifying each of said other network devices within said second logical group based on information received therefrom, assigning a priority to each link connecting the apparatus to said second logical group network devices, and configuring a portion of said links as active links based on said link priorities, wherein said link priorities are assigned such that a balance of active links is maintained across said second logical group network devices; and
    memory for storing said information received from said second logical group network devices.

11. The apparatus of claim 10 wherein the processor is further configured for transmitting said link priorities to said second logical group network devices.

12. The apparatus of claim 10 wherein assigning said link priorities comprises assigning said link priorities as said links come online and reassigning said priorities as required to balance the active links across said second logical group network devices.

13. The apparatus of claim 10 wherein the processor is further configured to receive an indication of a failure at one of said active links and reassign said priorities to balance said active links across said second logical group network devices.

14. The apparatus of claim 10 wherein assigning a priority comprises assigning a set of unique even numbers or a set of unique odd numbers.

15. The apparatus of claim 10 wherein said information is received in a Link Aggregation Control Protocol (LACP) message.

16. The apparatus of claim 15 wherein said LACP message comprises a TLV (Type-Length-Value) field containing an identifier uniquely identifying said second logical group network device.

17. The apparatus of claim 15 wherein said LACP message comprises a logical group ID and a logical group priority.

18. The apparatus of claim 10 further wherein the apparatus is configured to communicate with said first network device via a virtual port-channel peer link.

19. The apparatus of claim 10 wherein a port priority is assigned to one or more of said plurality of ports based on said link priority assigned to the link connected to the port.

20. An apparatus comprising:
    means for configuring the apparatus for operation in a first logical group with a first network device;
    means for receiving information from other network devices configured for operation in a second logical group, said information uniquely identifying each of said other network devices within said second logical group; and
    means for assigning a priority to each link connecting the apparatus to said second logical group network devices;
    wherein a portion of said links are selected as active links based on said link priorities and said link priorities are assigned such that a balance of active links is maintained across said second logical group network devices.

* * * * *